(No Model.)  2 Sheets—Sheet 1.
E. J. REA.
BICYCLE BRAKE.
No. 524,398.  Patented Aug. 14, 1894.
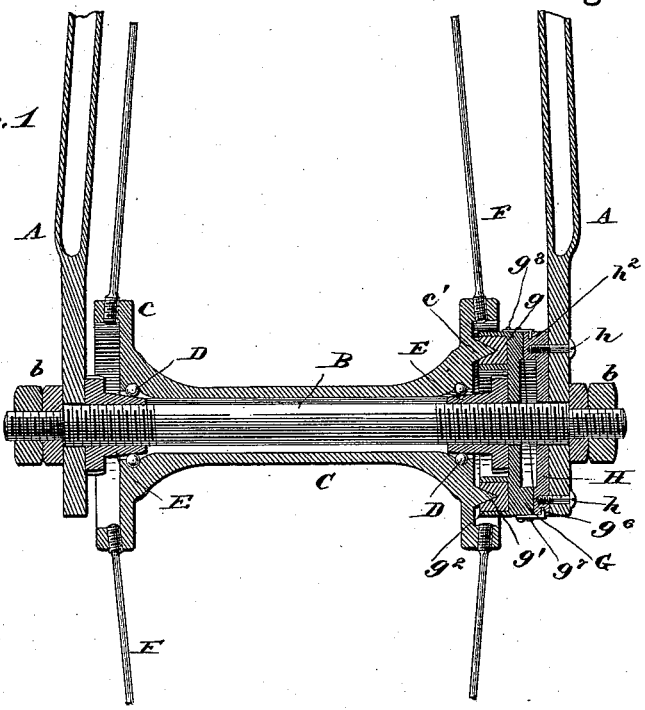
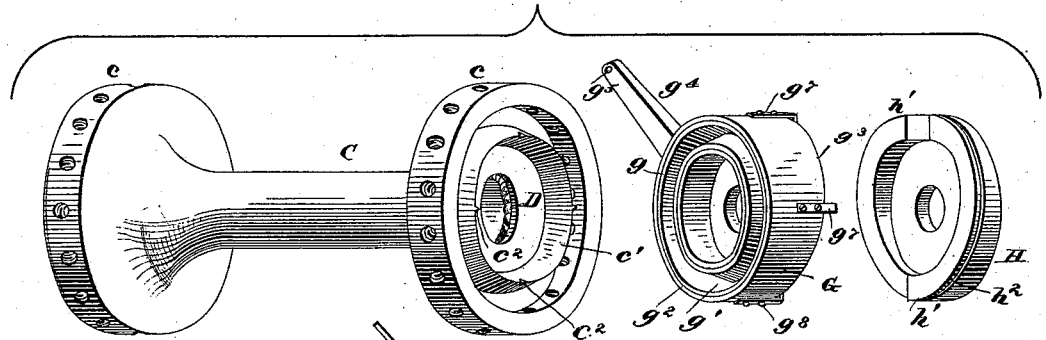
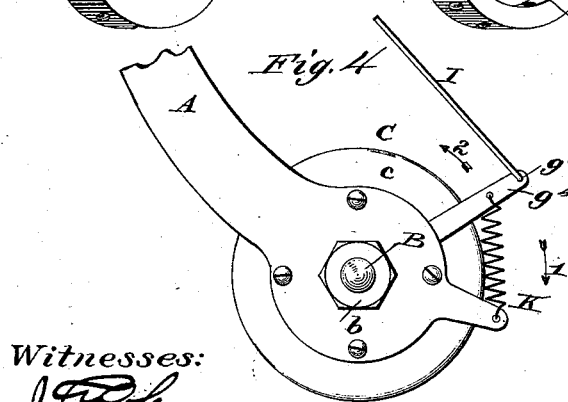
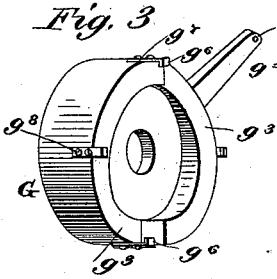
Witnesses:
J. F. Coleman
A. J. Birney
Inventor:
Edward J. Rea
by May George
Atty (No Model.) 2 Sheets—Sheet 2.
E. J. REA.
BICYCLE BRAKE.
No. 524,398. Patented Aug. 14, 1894.
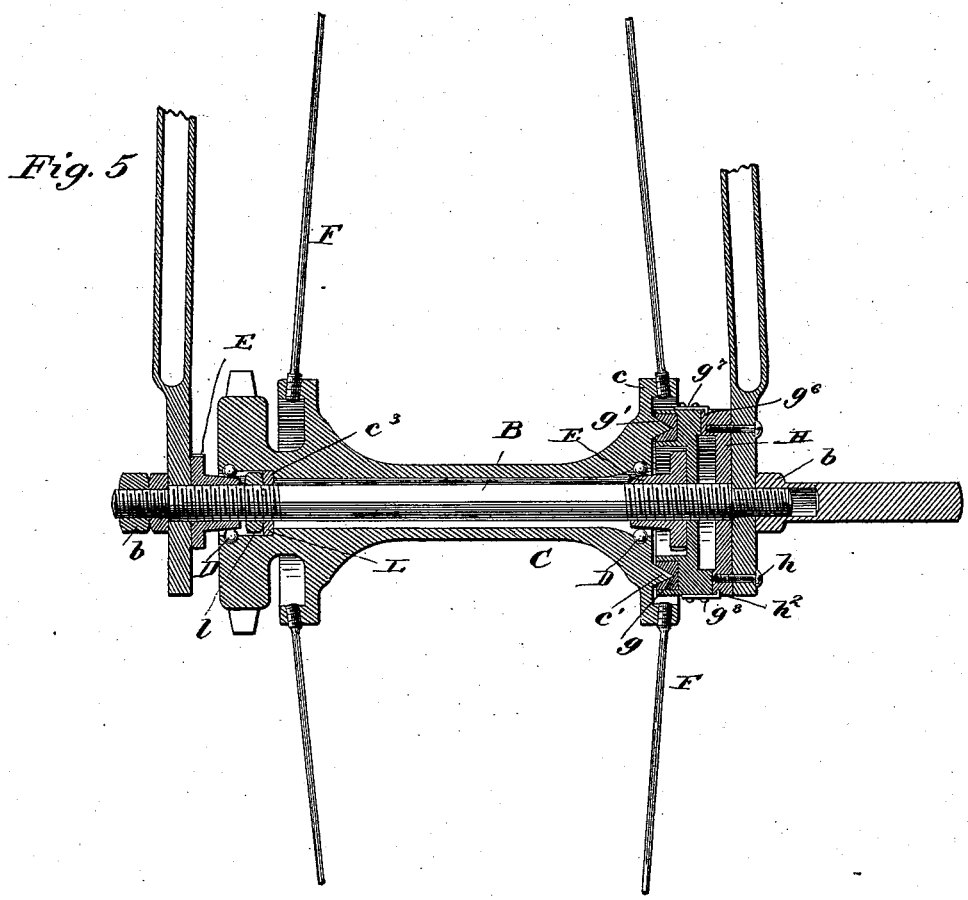
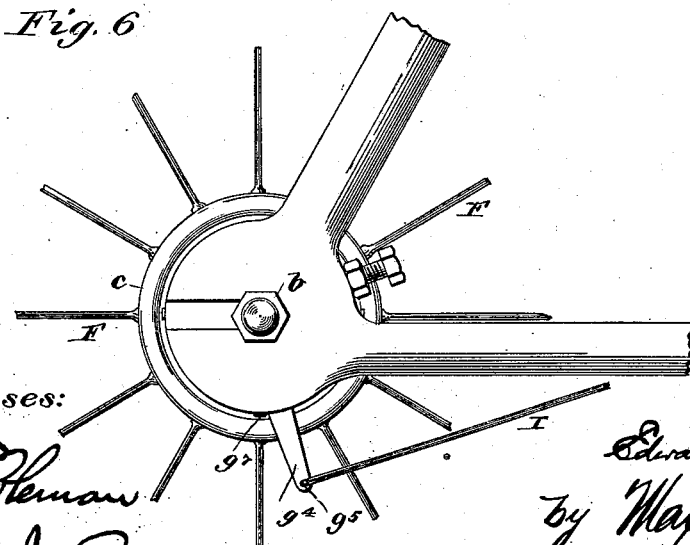
Witnesses:
Inventor:
Edward J. Rea
by May Fargü
Att'y.
THE NORRIS PETERS CO., PHOTO-LITHO., WASHINGTON, D. C.

UNITED STATES PATENT OFFICE.

EDWARD J. REA, OF WASHINGTON, DISTRICT OF COLUMBIA, ASSIGNOR OF ONE-HALF TO CHARLES J. WEEDON, OF SAME PLACE.

BICYCLE-BRAKE.

SPECIFICATION forming part of Letters Patent No. 524,398, dated August 14, 1894.

Application filed August 15, 1893. Serial No. 483,220. (No model.)

*To all whom it may concern:*

Be it known that I, EDWARD J. REA, a citizen of the United States, residing at Washington, in the District of Columbia, have invented certain new and useful Improvements in Bicycle-Brakes; and I do hereby declare the following to be a full, clear, and exact description of the invention, such as will enable others skilled in the art to which it appertains to make and use the same.

My invention relates to improvements in brakes for bicycles.

The object of my invention is to produce a brake which will be simple in construction, easily repaired, and readily cleaned.

Another object of my invention is to construct a brake in which the rubbing surfaces, when brought together, will keep in perfect contact, and in which the wear of said rubbing surfaces will not reduce the effectiveness of the brake.

With these objects in view my invention consists, broadly, of a stationary, double cam-disk and a movable cam-disk, the latter being provided with fingers, which engage with spiral grooves in the former disk. The movable contact-disk carries a contact washer having a V-shaped groove, in which enters a V-shaped projecting ring, preferably constructed integral with the hub of the wheel. The friction is produced between the V-shaped ring and the grooved washer, by partly rotating the movable disk, through the medium of a suitable brake-actuating mechanism. A spring serves to rotate the movable disk in a backward direction, and the fingers on the movable disk, engaging the spiral grooves in the stationary disk, serve to draw the friction surfaces out of contact. The spring may be applied at any suitable place, either directly to the movable disk or on the brake-lever, as desired.

My invention also consists in such features and combinations of parts, as will first be described in connection with the accompanying drawings, and then particularly pointed out in the claims.

In the drawings—Figure 1 is a vertical central sectional view of a brake embodying my invention, applied to the front wheel of a bicycle. Fig. 2 is a detail perspective view of the wheel-hub and brake-device, showing them apart. Fig. 3 is a detail perspective view of the movable cam-disk, showing the side opposite to that shown in Fig. 2. Fig. 4 is a side elevation of the end of the front fork, with the brake device. Fig. 5 is a vertical sectional view of a brake, embodying my invention, applied to the rear wheel of a bicycle. Fig. 6 is a side elevation of the same.

Referring to Figs. 1 to 4, inclusive, A is the front fork of a bicycle, constructed in the usual manner, and connected by an axle, B, provided with nuts, $b$, threaded onto each end outside the fork, and serving to prevent the tines of the fork from spreading apart. On the axle is mounted the wheel-hub, C, rotatable on the balls, D, which move on the conical bushings, E, threaded onto the axle, in the usual way, and adjustable to or from each other, for the purpose of taking up the wear. The hub has flanges, $c$, into which the spokes, F, are threaded, or otherwise secured. On one end of the hub, preferably within the flanges, is an annular V-shaped projection, $c'$, which forms one of the friction or contact surfaces of the brake. This projection enters an annular V-shaped groove, $g'$, in a ring, $g$, preferably of wood, cellulose, hard rubber, or other suitable material. The ring, $g$, is firmly held by its elasticity and friction, within an annular, square groove, $g^2$, in a movable cam-disk, G, having the cam-faces, $g^3$. An arm, $g^4$, preferably made integral with the cam-disk, G, projects at right angles to the axle, B, and is provided with a hole, $g^5$, for the attachment of the brake-actuating mechanism.

H is a stationary cam-disk secured to the fork of the bicycle, by screws, $h$, passing through the fork and threaded into the disk. This disk is provided with corresponding cam-faces, $h'$, arranged to contact with the cam-faces, $g^3$, of the cam-disks, G. It also has peripheral, spiral grooves, $h^2$, into which enter the inward-projecting ends, $g^6$, of the fingers, $g^7$, secured to the movable cam-disk, G, by means of screws $g^8$, as shown.

From the description thus far, it will be plain that, when the arm, $g^4$, is drawn in one direction, the cam-faces will crowd the movable disk against the end of the hub of the wheel, the V-shaped projection entering the V-shaped groove, and creating friction, which may be made so great by the tightening of the cam-faces as to almost or completely lock the wheel to the fork. When the arm, $g^4$, is moved in the opposite direction, the fingers, $g^7$, having their ends, $g^6$, in the grooves, $h^2$, draw the movable cam-disk, G, away from the hub of the wheel, and it is to be particularly noticed that, when so removed, every part of the brake-mechanism is at rest, and neither rests on nor is carried by the moving parts of the vehicle.

The preferable arrangement of the cam-faces is such that the direction of movement for locking the brake will be opposite to the direction of rotation of the wheels when the bicycle is moving forward, as will be plain from Fig. 4, where the arrow, 1, indicates the direction of rotation of the wheel, while the arrow, 2, shows the direction in which the arm is moved to apply the brake. Were the arrangement otherwise, when the brake was applied, the forward rotation of the wheel would tend to lock the wheel so tightly as to render it difficult, if not impossible, to release it.

For the purpose of applying the brake conveniently, the brake-mechanism, which may be of the usual construction, is connected by the rod, I, to the arm, $g^4$, and, to release the brake, a spring may be used, which may be part of the brake-actuating mechanism, as usual, or may be located at the fork, as shown at K, Fig. 4, being secured to the arm at one end, and to the fork at the other end.

It will be obvious that, as the grooved projection, $c'$, presses into the groove, $g'$, of the movable disk, it will wear away the ring, $g$, and this wear will take place more rapidly at the sides of the groove than at the bottom, so that, in time, the sides of the projection and groove would no longer touch, and the only friction would be that between the bottom of the groove and the top of the projection, which would be so small as to amount to but little in stopping the bicycle properly. To overcome this disadvantage, I preferably provide the projection with a cutting device, preferably a series of spurs, $c^2$, which cut away the bottom of the groove, thereby allowing the sides of the projection and groove to always stay in contact when the brake is in operation.

When the ring, $g$, has been worn until useless, it may be readily removed by pulling it out, and a new one may be inserted, thus making the brake as good as new again.

In Figs. 5 and 6, I have shown the same device as it appears when applied to the hind wheel of a bicycle. In this case, the opposite end of the wheel hub carries a sprocket wheel.

It is apparent that when the brake is applied to stop the wheel, there is a tendency on the part of the cam-disks to crowd the hub of the wheel away from that end at which the brake is located, thereby throwing a lateral pressure on the balls and their bearings. This is objectionable, as it tends to cause a wear of the interior surface of the hub at the side of the balls, and, to overcome it, it is necessary to provide means for resisting the lateral pressure on the hub. This means preferably consists of the construction shown in Fig. 5, which represents my invention as applied to the rear wheel of a bicycle. The shaft or axle, B, is screw-threaded inward some distance beyond the bushing, at the end opposite the break, and on this thread is screwed a washer-nut, L, outside of which is placed a lock-nut, $l$, also screwed onto the axle. The interior diameter of the hub is enlarged as shown, thus forming a shoulder, $c^8$, against which the face of the washer-nut, L, normally contacts, and, when the brake is applied, prevents the lateral movement of the wheel. As the washer-nut or the shoulder wears, the lost motion may be taken up by screwing up the washer-nut and its lock-nut.

It will be observed that my brake device does not interfere with the use of the conical bushings for taking up the wear, as it is possible either to take out the axle and remove the brake, then apply the axle, and adjust the bushings, after which the axle is again removed, the brake replaced and the axle inserted, or the adjustment may be made all from one side, by tightening up that bushing on the side opposite the brake, which is the most convenient method.

Having thus fully described my invention, what I claim as new, and desire to secure by Letters Patent, is—

1. The combination, with an annular V-shaped projecting friction-surface, of a series of cutting devices secured to the apex of the V-shaped projection, and an annular friction-surface of softer material than the V-shaped projection and provided with a V-shaped groove arranged to engage with the said V-shaped projection, substantially as set forth.

2. The combination, with a stationary disk having cam faces at one side and a spiral channel in its periphery, of a wheel-hub having a friction surface, a movable disk having a friction surface on one side and cam faces on the opposite side, a series of fingers secured to the movable disk and having ends projecting into the spiral groove in the stationary disk, and means for rotating the movable disk in either direction, substantially as set forth.

3. The combination, with an axle, a wheel-hub having an axle opening larger in diameter than the axle and provided with a ball-channel at each end, and a shoulder at one end, of a washer threaded onto the axle and bearing against the shoulder, a series of balls located in each ball-channel, a conical bushing threaded onto each end of the axle and normally holding the balls into the channel, and a brake-device acting laterally against the hub of the wheel at the end opposite the shoulder, substantially as set forth.

In testimony whereof I affix my signature in presence of two witnesses.

EDWARD J. REA.

Witnesses:
M. C. MASSIE,
E. A. PAUL.